US011983239B2

(12) United States Patent
Lian et al.

(10) Patent No.: US 11,983,239 B2
(45) Date of Patent: May 14, 2024

(54) LIGHTWEIGHT TRANSFORMER FOR HIGH RESOLUTION IMAGES

(71) Applicant: Lemon Inc., Grand Cayman (KY)

(72) Inventors: Xiaochen Lian, Los Angeles, CA (US); Mingyu Ding, Los Angeles, CA (US); Linjie Yang, Los Angeles, CA (US); Peng Wang, Los Angeles, CA (US); Xiaojie Jin, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 330 days.

(21) Appl. No.: 17/342,483

(22) Filed: Jun. 8, 2021

(65) Prior Publication Data
US 2022/0391635 A1   Dec. 8, 2022

(51) Int. Cl.
G06V 20/56 (2022.01)
G06F 18/213 (2023.01)
G06F 18/24 (2023.01)
G06N 3/04 (2023.01)
G06N 3/08 (2023.01)
G06V 10/32 (2022.01)
G06V 10/82 (2022.01)

(52) U.S. Cl.
CPC ............ *G06F 18/213* (2023.01); *G06F 18/24* (2023.01); *G06N 3/04* (2013.01); *G06N 3/08* (2013.01); *G06V 10/82* (2022.01)

(58) Field of Classification Search
CPC ......... G06F 18/213; G06F 18/24; G06N 3/04; G06N 3/08; G06V 10/82
See application file for complete search history.

(56) References Cited

U.S. PATENT DOCUMENTS

2019/0370648 A1   12/2019   Zoph et al.
2022/0300807 A1*  9/2022   Spagnoli ............... G06N 3/048

FOREIGN PATENT DOCUMENTS

CN   111274865 A   6/2020

OTHER PUBLICATIONS

Vaswani, Ashish, et al. "Attention is all you need." Advances in neural information processing systems 30 (2017). (Year: 2017).*
International Search Report dated Sep. 26, 2022 in International Application No. PCT/SG2022/050295.

(Continued)

*Primary Examiner* — Utpal D Shah
(74) *Attorney, Agent, or Firm* — Faegre Drinker Biddle & Reath LLP

(57) ABSTRACT

Systems and methods for obtaining attention features are described. Some examples may include: receiving, at a projector of a transformer, a plurality of tokens associated with image features of a first dimensional space; generating, at the projector of the transformer, projected features by concatenating the plurality of tokens with a positional map, the projected features having a second dimensional space that is less than the first dimensional space; receiving, at an encoder of the transformer, the projected features and generating encoded representations of the projected features using self-attention; decoding, at a decoder of the transformer, the encoded representations and obtaining a decoded output; and projecting the decoded output to the first dimensional space and adding the image features of the first dimensional space to obtain attention features associated with the image features.

20 Claims, 11 Drawing Sheets

(56) References Cited

OTHER PUBLICATIONS

Ranftl R. et al., "Vision Transformers for Dense Prediction," Computer Vision Foundation, pp. 12179-12188, arXiv:2103.13413v1, Mar. 24, 2021 [Retrieved on Aug. 24, 2022].
Dosovitskiy A. et al., "An Image Is Worth 16x16 Words: Transformers For Image Recognition At Scale," ICLR 2021, pp. 1-21, arXiv:2010.11929v2, Jun. 3, 2021 [Retrieved on Aug. 24, 2022].
Wu B. et al., "Visual Transformers: Token-based Image Representation and Processing for Computer Vision," pp. 1-12, arXiv:2006.03677v4, Nov. 20, 2020 [Retrieved on Aug. 24, 2022].
International Search Report dated Jun. 7, 2022 in International Application No. PCT/SG2022/050296.
Wang J. et al., Deep High-Resolution Representation Learning for Visual Recognition. IEEE Transactions on Pattern Analysis and Machine Intelligence, Apr. 1, 2020, vol. 43, No. 10, pp. 3349-3364 [Retrieved on Jun. 7, 2022] <DOI: 10.1109/TPAMI.2020.2983686> Sections 3 and 4; Figures 2-4.
Doshi K. Transformer Explained Visually (Part 3): Multi-head Attention, deep dive. Jan. 17, 2021 [Retrieved on Jun. 8, 2022 from https://towardsdatascience.com/transformersexplained-visually-part-3-multi-head-attention-deep-dive-1c1ff1024853] Whole document.

\* cited by examiner

LIGHTWEIGHT TRANSFORMER FOR HIGH RESOLUTION IMAGES

BACKGROUND

Neural architecture search (NAS) is a technique used to automate the design of artificial neural networks (ANN), a frequently used model in the area of machine learning. NAS has been used to design networks that can outperform hand-designed architectures. Methods for NAS can be categorized according to the search space, search strategy, and performance estimation strategy used, where the search space defines the type(s) of ANN that can be designed and optimized, the search strategy defines the process used to explore the search space, and the performance estimation strategy evaluates the performance of an ANN based on its design.

In image and computer vision tasks, high-resolution representations (HR) are essential for dense prediction tasks such as segmentation, detection, and pose estimation. Learning HR representations is typically ignored in previous NAS methods that focus on image classification. While NAS methods have achieved success in automatically designing efficient models for image classification and to improve efficiency of models for dense prediction tasks such as semantic segmentation and pose estimation, existing NAS methods for dense prediction either directly extend the search space designed for image classification or only search for a feature aggregation head. This lack of consideration to the specificity of dense prediction hinders the performance advancement of NAS methods compared to the best hand-crafted models.

In principle, dense prediction tasks require integrity of global context and high-resolution representations. The former is critical to clarify ambiguous local features at each pixel, and the latter is useful for accurate predictions of fine details, such as semantic boundaries and key point locations. However, the integrity of global context and high-resolution representations have not been the focus of prominent NAS algorithms for classification. Commonly, multi-scale features have been combined at the end of the network while recent approaches have increased performance by putting multi-scale feature processing within the network backbone. In addition, multi-scale convolutional representations do not provide a global outlook of the image since dense prediction tasks often come with high input resolution, while a network often covers a fixed receptive field. Therefore, global attention strategies such as Squeeze-and-Excitation Network (SENet) or non-local networks have been proposed to enrich image convolutional features. Transformers, widely used in natural language processing, have exhibited good results when combined with a convolutional neural network for image classification and object detection. However, the computational complexity associated with transformers increases quadratically with the number of pixels; thus, a transformer implementation has been known to be computationally expensive.

It is with respect to these and other general considerations that embodiments have been described. Although relatively specific problems have been discussed, it should be understood that the examples described herein should not be limited to solving the specific problems identified in the background above.

SUMMARY

In accordance with examples of the present disclosure, systems and methods directed to high-resolution Neural Architecture Search (HR-NAS) are described. HR-NAS implementations described herein can find efficient and accurate networks for different tasks, by effectively encoding multiscale contextual information while maintaining high-resolution representations. To better encode multiscale image contexts in the search space of HR-NAS, a lightweight transformer having a computational complexity that can be dynamically changed with respect to different objective functions and computation budgets is utilized. In order to maintain high-resolution representations of learned networks, HR-NAS makes use of a multi-branch architecture that provides convolutional encoding of multiple feature resolutions. Accordingly, an efficient fine-grained search strategy can be used to train HR-NAS, which effectively explores the search space and determines optimal architectures given various tasks and computation resources.

In accordance with examples of the present disclosure, a method of obtaining attention features is described. The method may include receiving, at a projector of a transformer, a plurality of tokens associated with image features of a first dimensional space; generating, at the projector of the transformer, projected features by concatenating the plurality of tokens with a positional map, the projected features having a second dimensional space that is less than the first dimensional space; receiving, at an encoder of the transformer, the projected features and generating encoded representations of the projected features using self-attention; decoding, at a decoder of the transformer, the encoded representations and obtaining a decoded output; and projecting the decoded output to the first dimensional space and adding the image features of the first dimensional space to obtain attention features associated with the image features.

In accordance with examples of the present disclosure, a system is described. The system may include one or more storage devices storing instructions that when executed by one or more hardware processors, cause the one or more hardware processors to implement a neural network for generating image attention features by processing image features combined with a two-dimensional position map. The neural network may include: a projector of a transformer configured to receive a plurality of tokens associated with image features of a first dimensional space and generate projected features by concatenating the plurality of tokens with the two-dimensional positional map, the projected features having a second dimensional space that is less than the first dimensional space; an encoder of the transformer configured to receive projected features and generate encoded representations of the projected features using self-attention; and a decoder configured to decode the encoded representations and obtain a decoded output, wherein the decoded output is projected to the first dimensional space and combined with the image features of the first dimensional space to obtain the attention features.

In accordance with examples of the present disclosure, a non-transitory computer-readable storage medium comprising instructions being executable by one or more processors to perform a method is described. The method may include receiving, at a projector of a transformer, a plurality of tokens associated with image features of a first dimensional space; generating, at the projector of the transformer, projected features by concatenating the plurality of tokens with a positional map, the projected features having a second dimensional space that is less than the first dimensional space; receiving, at an encoder of the transformer, the projected features and generating encoded representations of the projected features using self-attention; decoding, at a decoder of the transformer, the encoded representations and obtaining a decoded output; and projecting the decoded output to the first dimensional space and adding the image features of the first dimensional space to obtain attention features associated with the image features.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
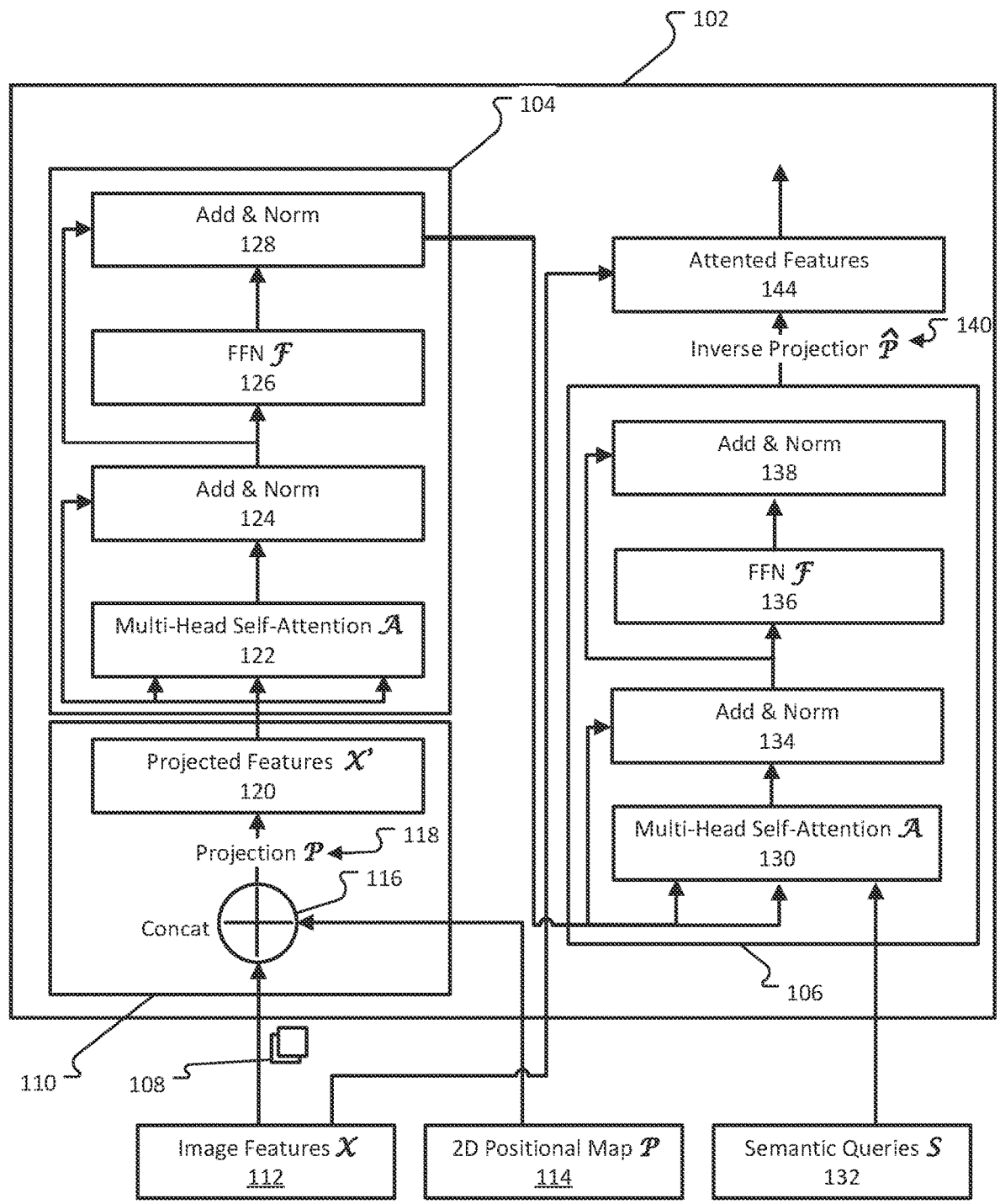
FIG. 1 depicts details of an example transformer in accordance with examples of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

NAS methods have achieved remarkable success in automatically designing efficient models for image classification. NAS has also been applied to improve efficiency of models for dense prediction tasks such as semantic segmentation and pose estimation. However, existing NAS methods for dense prediction either directly extend the search space designed for image classification or only search for a feature aggregation head. This lack of consideration to the specificity of dense prediction hinders the performance advancement of NAS methods compared to the best hand-crafted models.

In principle, dense prediction tasks require integrity of global context and high-resolution representations. The former is critical to clarify ambiguous local features at each pixel, and the latter is useful for accurate predictions of fine details, such as semantic boundaries and key point locations. However, these principles, especially HR representations, have not been the focus of prominent NAS algorithms for classification. Commonly, multi-scale features have been combined at the end of the network while recent approaches show that performance can be enhanced by putting multi-scale feature processing within the network backbone. In addition, multi-scale convolutional representations cannot provide a global outlook of the image since dense prediction tasks often come with high input resolution, while a network often covers a fixed receptive field. Therefore, global attention strategies such as SENet or non-local networks have been proposed to enrich image convolutional features. Transformers, widely used in natural language processing, have exhibited good results when combined with a convolutional neural network for image classification and object detection. However, the computational complexity associated with transformers increases quadratically with the number of pixels; thus, a transformer implementation is computationally expensive. In accordance with examples of the present disclosure, in-network multi-scale features and transformers are incorporated with NAS methods to obtain NAS enabled with dynamic task objectives and resource constraints.

In examples a dynamic down projection strategy is utilized to overcome issues associated with the computationally expensive costs associated with implementing transformers with image pixels. Accordingly, a lightweight and plug-and-play transformer architecture is described that that is combinable with convolutional neural architectures. In addition, to search a fused space of multi-scale convolutions and transformers, proper feature normalization, selection of fusion strategies, and balancing is needed. Accordingly, various model choices may be used that generalize and prefer multiple tasks based on the number of queries of the transformer.

In accordance with examples of the present disclosure, a super network also referred to as a "SuperNet" is first defined, where each layer of the SuperNet includes a multi-branch parallel module followed by a fusion module. The parallel module includes searching blocks with multiple resolutions, and the fusion module includes searching blocks of feature fusion that determine how features from different resolutions fuse. Based on the computational budget and task objectives, a fine-grained progressive shrinking search strategy can be used to efficiently prune redundant blocks in the network and channel in convolutions and transformer queries, resulting in an efficient model. In accordance with examples of the present disclosure, a transformer that is highly efficient and can be easily combined with convolutional networks for image and computer vision tasks is described. In accordance with examples of the present disclosure, a multi-resolution search space including both convolutions and transformers to model in-network multi-scale information and global contexts for dense prediction tasks is described. Thus, a transformer integrated into a resource-constrained NAS search space for image and computer vision tasks is described. In accordance with examples of the present disclosure, a resource-aware method of search that determines efficient architectures for different tasks is described.

FIG. 1 depicts a neural network system, also referred to as a transformer 102, in accordance with examples of the present disclosure. The transformer 102 is an example of a system implemented as computer programs on one or more computers in one or more locations, in which the systems, components, and techniques described below can be implemented. The transformer includes a projector 110, an encoder 104 and a decoder 106. Generally, both the encoder 104 and the decoder 106 are attention-based, i.e., both apply an attention mechanism (e.g., Multi-Head Self-Attention configuration) over their respective received inputs while transforming an input sequence. In some cases, neither the encoder nor the decoder includes any convolutional layers or any recurrent layers. The projector 110 uses a point-wise convolution (with Batch Normalization) to reduce the channel dimension of the feature map from $c+d_p$ (wherein c denotes the channel number of the input feature X, and $d_p$ denotes the channel number of the positional map P) to a smaller dimension n, where n denotes the number of queries. The projector 110 may use bilinear interpolation to resize the spatial dimension of the feature map to s×s. That is, to reduce computational cost, the input feature $X \in \mathbb{R}^{c \times h \times w}$ is projected into a reduced size of n×s×s, by a projection function $\mathcal{P}(\cdot)$, where n denotes the number of queries and s×s is the reduced spatial size. Thus, the projection process can be represented by X'=$\mathcal{P}$(Concat(X, P)), where Concat denotes the concatenation operator, input sequence $X' \in \mathbb{R}^{n \times s^2}$ is the projected and flattened embedding, $P \in \mathbb{R}^{d_p \times h \times w}$ is a positional encoding which compensates for the loss of spatial information during the self-attention process. When $d_p=2$, $P \in \mathbb{R}^{2 \times h \times w}$ can be a two-dimensional positional map compensating for the loss of spatial information during the self-attention process. Compared with sinusoidal positional encoding and learned embeddings, the two-dimensional positional map P, which contains two channels (i.e., $d_p=2$), is more efficient in terms of computational requirements for lightweight visual models. The two-dimensional position map can be obtained according to the following equations:

$P[0,i,j]=i/h$, $i \in [0,h-1]$;

$P[1,i,j]=j/w$, $i \in [0,w-1]$

A 1×1 convolutional and bilinear interpolation may be performed to achieve the projection $P(\cdot)$ and inverse projection $\hat{P}(\cdot)$ in the transformer 102. The original image features X 112 may be divided into n tokens 108 to achieve a low-dimensional space. Each token 108 may be concatenated at 116 with the 2D positional map $\mathcal{P}$ 114 to arrive at a projected feature $\mathcal{P}$ 118. That is, the input image feature X 112 is transformed into a set of n tokens X', and each token in the set of n tokens X' includes an $s^2$ dimensional semantic embedding with positional information. The projected features X' may then be provided to the encoder 104 as queries, keys, and values Q, K, $V \in \mathbb{R}^{n \times s^2}$.

The encoder 104 includes a Multi-Head Self-Attention $\mathcal{A}(\cdot)$ configuration 122, which allows the encoder 104 to jointly attend to information at different positions. More specifically, the Multi-Head Self-Attention configuration $\mathcal{A}(\cdot)$ 122 can be defined as: $\mathcal{A}(Q, K, V)$=Concat (head$_1$, ..., head$_h$)$W^O$, where $$\text{head}_i = \text{Attention}((QW_i^Q, KW_i^K, VW_i^V)) = \text{softmax}\left[\frac{QW_i^Q(KW_i^K)^T}{\sqrt{d}}\right]VW_i^V,$$

where h is the number of heads, d is the hidden dimensions of the attended subspaces, and $W_i^Q$, $W_i^K \in \mathbb{R}^{s^2 \times d}$, $W_i^V \in \mathbb{R}^{s^2 \times d}$, $W^O \in \mathbb{R}^{hd \times s^2}$ are learned embedding s (weights).

Using a residual connection, the output of the Multi-Head Self-Attention $\mathbb{R}$ configuration 122 is combined with the inputs to the Multi-Head Self-Attention $\mathbb{R}$ 122 at an addition and normalization operation 124. The output of the addition and normalization operation 124 is an encoder self-attention residual output which is provided to a position-wise feed-forward network 126. The position-wise feed-forward network $\mathcal{F}(\cdot)$ 126 may include two linear transformations with a ReLU activation in between; the position-wise feed-forward network $\mathcal{F}(\cdot)$ 126 is applied to the attended features as $\mathcal{F}(x)=\max(0,xW_1+b_1)W_2+b_2$, where the expansion ratio $\mathcal{F}(\cdot)$ is set to 4 for example, $W_1 \in \mathbb{R}^{s^2 \times 4s^2}$, $W_2 \in \mathbb{R}^{4s^2 \times s^2}$, $b_1$ and $b_2$ denotes weights and a bias of the linear layers, respectively.

Accordingly, the encoder 104 can be represented by $\mathcal{F}(\mathcal{A}(Q, K, V))$, where the token-wise attention $A \in \mathbb{R}^{n \times n}$ is first calculated and linear transformation is then applied across the spatial-wise positions to obtain the global attended feature F. A residual connection from the Add & Norm operation 124 around the Feed-Forward Network 126 to the Add & Norm 128 is employed. The output of the encoder 104 is provided to the decoder 106.

The decoder 106 follows a similar flow as the encoder 104; the output from the encoder 104 is provided to the Multi-Head Self-Attention configuration $\mathcal{A}$ 130, where the Multi-Head Self-Attention configuration $\mathcal{A}$ 130 also receives semantic queries S 132. That is, Q, K, and V are provided to the Multi-Head Self-Attention configuration $\mathcal{A}$ 130. The Multi-Head Self-Attention configuration $\mathcal{A}$ 130 uses the output of the encoder 104 as keys and values and the learnable semantic embeddings $S \in \mathbb{R}^{n \times s^n}$ (e.g., a set of n learnable $s^2$-dimensional sematic embeddings) as queries. Using a residual connection, the output of the Multi-Head Self-Attention $\mathcal{A}$ configuration 130 is combined with the inputs to the Multi-Head Self-Attention $\mathcal{A}$ 130 at the additional and normalization operation 138 to generate decoder self-attention residual output. The decoder self-attention residual output is provided to the position-wise feed-forward network $\mathcal{F}(\cdot)$ configuration 136. A residual connection from the Add & Norm operation 134 around the feed-forward network 136 to the Add & Norm operation 138 is employed. The output of the decoder 106 is then projected back to the original feature size c×h×w by an inverse projection function $\hat{P}(\cdot)$ and then added to the image features X 112. Because the image modeling is not a prediction task, and there are no temporal relationships between the semantic embedded queries, a first Multi-Head Attention configuration in a standard Transformer decoder (that is, a first Multi-Head Attention configuration that provides an input to the Multi-Head Attention configuration 130) can be omitted from the decoder 106.

Time complexity of the Multi-Head Self-Attention and the Feed-Forward Networks are $O(4nds^2+2n^2d)$ and $O(8ns^4)$, where $s^2$, d, and n are in the projected low-dimensional space. Since $s^2$ is a projected small spatial size, the overall time complexity (FLOPs) $O_\tau(n)$ of the transformer 102 is approximately linear with $n^2d$. Accordingly, in some examples, the Transformer 102 may be utilized in a fine-grained search strategy to reduce and select an appropriate n to further make the Transformer 102 more efficient.

Non-limiting differences between the Transformer 102 and a standard Transformer include the use of the projection function $\mathcal{P}(\cdot)$ for learning self-attention in a low-dimensional space; using a two-dimensional positional map P rather than a sinusoidal positional encoding; the first Multi-Head Attention and the spatial encoding in the standard Transformer decoder are omitted; and the output of the encoder 104 is directly used as the keys and values of the decoder 106 with residual connections (e.g., a residual connection around the Multi-Head Self-Attention $\mathcal{A}$ configuration 130).

Figure 2:
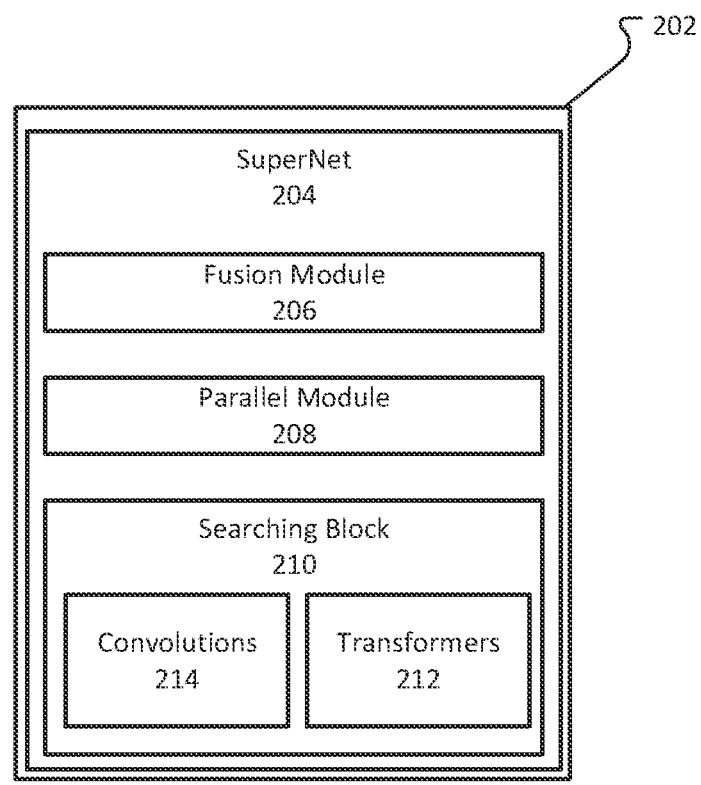
FIG. 2 depicts details of a multi-branch search space for dense predictions that includes both multiscale features and global contexts in accordance with examples of the present disclosure.

In accordance with examples of the present disclosure, FIG. 2 depicts a multi-branch search space 202 for dense predictions that includes both multiscale features and global contexts while maintaining high-resolution representations throughout the neural network. The SuperNet 204 is a multi-branch network including a plurality of searching blocks 210, where each searching block includes at least one convolutional layer 214; in example, the searching block 210 may also include a transformer 212. The transformer 212 may be the same as or similar to the transformer 102 previously described in the present disclosure. Unlike previous searching methods for a specific task, the network searching network may be customized for various dense prediction tasks. The multi-branch search space may include a parallel module 208 and a fusion module 206. In an example, the parallel module 208 and a fusion module 206 are configured alternatively. For example, a fusion module can be used after a parallel module to exchange information across multiple branches. In an example, the parallel module 208 and the fusion module 206 utilize the searching blocks 210.

Figure 3:
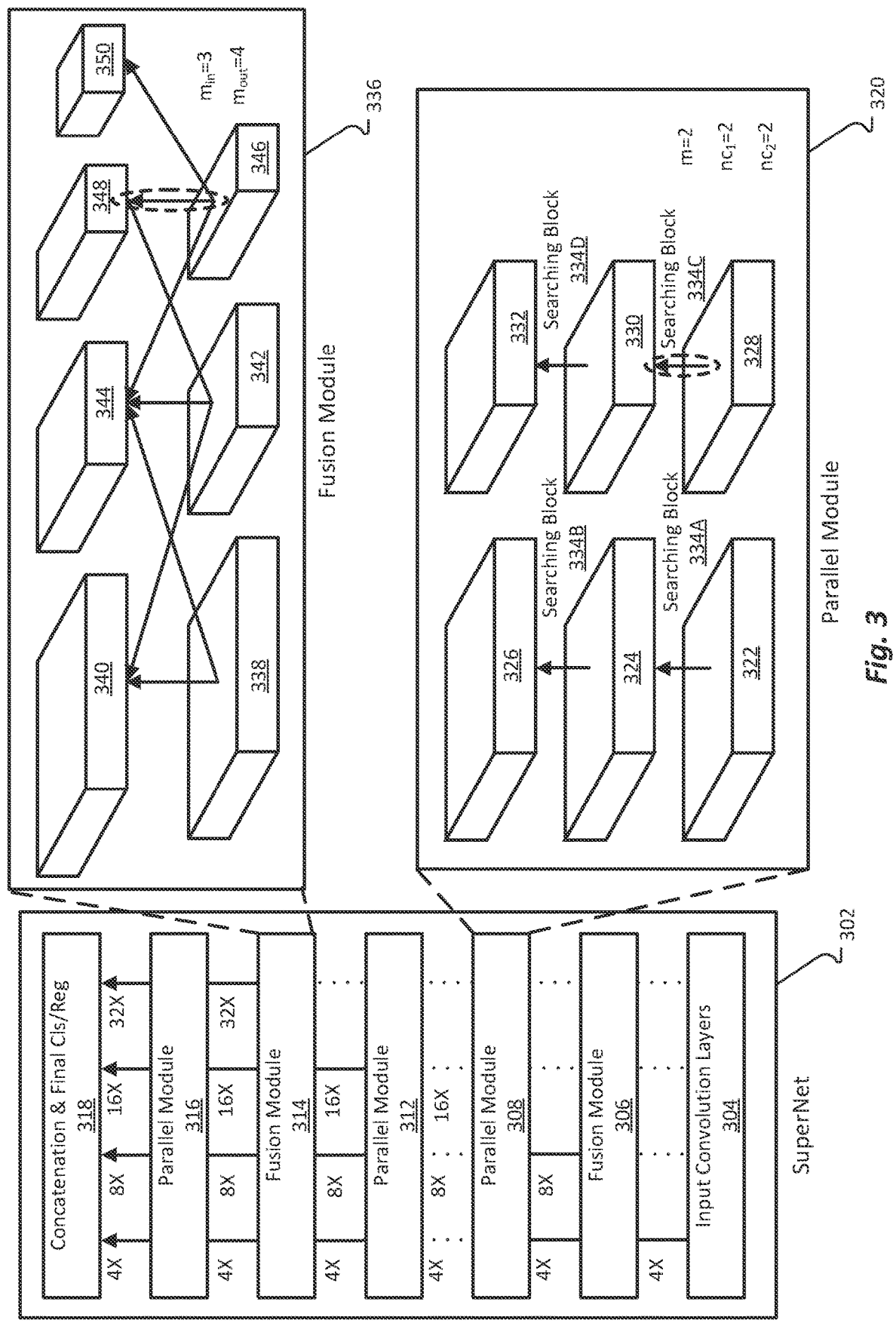
FIG. 3 additional details of the multi-branch search space for dense predictions in accordance with examples of the present disclosure.

FIG. 3 depicts additional details of the multi-branch search space for dense predictions in accordance with examples of the present disclosure. As depicted in FIG. 3, after one or more convolutional layers 304 reduce the feature solution, for example, to one quarter of the image size, low-resolution convolution branches are gradually added to high-resolution convolution branches using feature fusion through fusion modules 306, 314, etc. Multi-resolution branches are connected in parallel using the parallel modules, for example, parallel modules 308, 312, 316, etc. The multi-branch features are concatenated together and connected to a final classification/regression layer at 318.

The parallel module 320, which may be the same as or similar to the parallel modules 308, 312, 316, etc. generally obtains larger receptive fields and multi-scale features by stacking searching blocks in each branch. For example, a searching block 334A may reside between feature maps 322 and 324; a searching block 334B may reside between the feature maps 324 and 326. The searching blocks 334A and 334B may be the same or different. Feature maps 322, 324, and 326 are illustrative examples of higher-resolution feature maps. Similarly, a searching block 334C may reside between feature maps 328 and 330; a searching block 334D may reside between the feature maps 330 and 332. The searching blocks 334C and 334D may be the same or different. Searching blocks 334A, 334B, 334C, and 334D may be the same or different. Feature maps 328, 330, and 332 are illustrative examples of feature maps having a lower resolution than the feature maps 322, 324, and 326. In examples, the parallel module 320 includes m∈[1,4] branches containing $nc_1, \ldots nc_m$ convolutional layers with $nw_1, \ldots nw_m$ channels in each branch. That is, a parallel module can be represented as $[m, [nc_1, \ldots, nc_m], [nw_1, \ldots, nwm]]$.

The fusion module 336, which may be the same as or similar to the fusion modules 306, 314, etc. are utilized between two parallel modules with $m_{in}$ and $m_{out}$ branches to perform feature interactions between multiple branches using element-wise addition. For each output branch, neighboring input branches are fused using a searching block to unify feature map sizes. For example, an 8× output branch contains information of 4×, 8×, and 16× input branches. The high-to-low resolution feature transformation is implemented with a searching block and up-sampling. For example, searching blocks represented as arrows in the fusion module 336 may reside between feature maps 338 and 334, 338 and 340, 342 and 340, 342 and 344, 342 and 348, 346 and 344, 346 and 348, and 346 and 350. As in the parallel module, the searching blocks may be the same as each other or may be different from one another.

Figure 4:
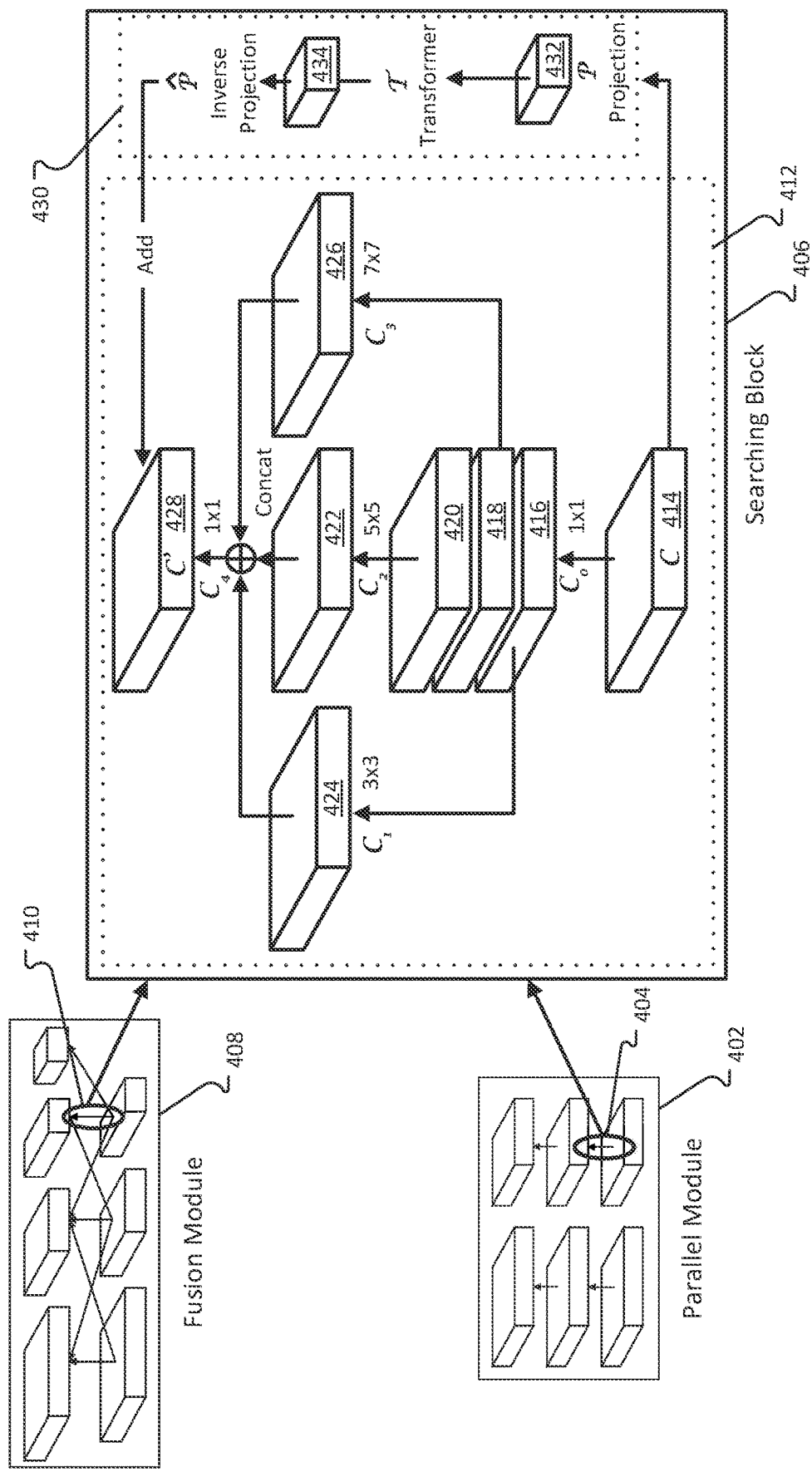
FIG. 4 depicts additional details of a searching block in accordance with examples of the present disclosure.

FIG. 4 depicts additional details of a searching block 406 in accordance with examples of the present disclosure. The searching block 406 may be the same as the searching block 404 in the parallel module and/or the searching block 410 in the fusion module. In examples, the searching block includes convolution layers 412 and at least one transformer 430, where the number of convolutional channels and the number of queries/tokens in the at least one transformer are searchable parameters. In examples, the convolutional layers 412 in the searching block 406 are organized following an efficient structure of an inverted residual block, and the at least one transformer 430 is included to enhance global contexts. In some examples, the convolutional layers 412 may be different than or otherwise include a different configuration than that which is depicted in FIG. 4. Similarly, in some examples, the searching block 406 may include a modified transformer that is different than the at least one transformer 430 depicted in FIG. 4, or the at least one transformer 430 may be omitted in its entirety.

If c denotes the channel number of the input feature X and the spatial dimensions h×w is omitted for reasons of simplicity, the first layer 414 may be defined as a 1×1 point-wise convolution $C_0$. The first layer is defined as a 1×1 pointwise $C_0 \in \mathbb{R}^{c \times 3rc}$ to expand the input feature to a high dimension having an expansion ratio of 3r using the convolution 416, 418, and 420. The three depth-wise convolutional layers, $C_1$ 424, $C_2$ 422, $C_3$ 426 $\in \mathbb{R}^{rc}$ with different kernel sizes of 3×3, 5×5, 7×7, are imposed on the three parts of the expended feature respectfully. The output of layers 424, 422, and 426 are then concatenated followed by a point-wise convolutional layer C' 428 $\in \mathbb{R}^{3rc \times c}$ to reduce the number of channels to c' (c'=c in the parallel module). At a same time, the Transformer $\mathcal{T}$ with n queries is applied to the input feature X to obtain global self-attention, which is then added to a final output. In this way, the Transformer $\mathcal{T}$ is considered to be a residual path to enhance the global context within each searching block. The information flow in a searching block can be written as: $X'=C_4$ (Concat($C_1(C_0(X)_1), C_2(C_0(X)_2), C_3(C_0(X)_3))) + \mathcal{T}((X))$, where $C_0(X)_i$ represents the i-th portion of the output of the first convolutional layer $C_0(X)$, as depicted in FIG. 4. In examples, a stride of two in the convolutions $C_1, C_2, C_3$ and a half-size inverse projection $\hat{P}(\bullet)$ in the transformer are used for reducing a searching block. In this way, the whole SuperNet (e.g., 302 FIG. 3) is constructed by reduction searching block described herein, making such a model an easy fit for a limited computational budget by shrinking the depth-wise convolutional channels of $C_1, C_2, C_3$ and queries/tokens of Transformer $\mathcal{T}$ while maintaining multi-scale and global information.

The SuperNet (e.g., 302 FIG. 3) is a multi-branch network including searching blocks, where each searching block may include a mixture of convolutional layers and a Transformer. Unlike previous searching methods for a specific task, the network for various dense prediction tasks may be customized to obtain an optimal feature combination for different tasks. For example, a resource-aware channel/query wise fine-grained search strategy may be used to explore the optimal feature combination for different tasks.

In examples, a progressive shrinking neural architecture search paradigm is used to generate light-weight models by discarding a portion of the convolutional channels and Transformer queries during training. In the searching block (e.g., 406), the 1×1 convolutional layers $C_0$, $C_4$ are utilized to ensure that each cell has fixed input and output dimensions. In contrast, the interaction between channels in depth-wise convolutions $C_1$, $C_2$, $C_3$ can be minimized such that that unimportant channels can be easily removed in the search processes. For example, if a channel in $C_1$ is unimportant and removed, convolutions $C_0$, $C_4$ can be adjusted to c×(3rc−1) and (3rc−1)×c' respectively (wherein c and c' represent the number of channels of convolutions $C_0$, $C_4$, respectively). Similarly, with a projection $\mathcal{P}(\bullet)$ and the inverse projection $\hat{P}(\bullet)$, the Transformer $\mathcal{T}$ may be designed to include a variable number of queries and tokens. If a query is discarded, then the projections $\mathcal{P}(\bullet)$ and $\hat{P}(\bullet)$ can process (n−1)×s×s sized features in the low-dimensional space. Accordingly, tokens and features of both the transformer of the encoder and the transformer of the decoder are automatically scaled. As an example, a searching block (e.g., 406) may contain (3rc+n) learnable sub-layers, wherein c is the number of channels of the searching block 406, r is the expansion ratio, and n is the number of tokens.

In examples, a factor α>0 can be learned jointly with the network weights to scale the output in each learnable sublayer of the search block (e.g., 406). The channels and queries having low importance can be progressively discarded while maintaining an overall performance of the searching block. In some examples, a resource-aware penalty on α may push other important factors to near-zero values. For example, the computational cost γ>0 for each sub-layer of the searching block (e.g., 406) is used to weight the penalty to fit for a limited computational budget:

$$\gamma_i = \begin{cases} 3\times 3 \times h \times w, & i \in [0, rc) \\ 5\times 5 \times h \times w, & i \in [rc, 2rc) \\ 7\times 7 \times h \times w, & i \in [2rc, 3rc) \\ O_{\mathcal{T}}(n') - \times O_{\mathcal{T}}(n'-1), & i \in [3rc, 3rc+n) \end{cases}$$

Where $O_{\mathcal{T}}$ is as provided above; i is the index of sub-layers, n' is the number of remaining queries (tokens), and $\gamma_i$ is the computational cost of the ith sub-layer. Thus, γ may be a fixed value in the three depth-wise convolutions $C_1$, $C_2$, $C_3$, while in the Transformer $\mathcal{T}$ it is a dynamic value set according to the number of remaining queries. With the added resource-aware penalty term, the overall training loss is:

$$L = L_{task} + \lambda \sum_{i \in [0, 3rc+n)} \gamma_i |\alpha_i|$$

Where $L_{task}$ denotes the standard classification/regression loss with the weight decay term for a specific task, and λ denotes the coefficient of the L1 penalty term. The weight decay may help to constrain the value of the network weight to prevent it from being too large and making important factors α difficult to learn. Within several epochs as time intervals, sub-layers having an important factor that is less than a threshold c can be removed and the statistics of Batch Normalization (BN) layers can be re-calibrated. If all tokens/queries of the Transformer are removed, the Transformer will degenerate into a residual path. When the search ends, the remaining structure can be used directly without the need for fine-tuning.

Based on resource-aware L1 regularization, an accuracy-efficiency trade-off for different amount of resource budges can be found. Considering that FLOPs is the most widely and easily used metric and approximated as the lower bound of the latency, FLOP may be used as a penalty weight. Other metrics can be applied similarly. Moreover, the multi-branch SuperNet can be customized for different tasks during the search process. Different convolutional channels and Transformer tokens of different branches are retained for different tasks; thus, the optimal low-level/high-level and local/global feature combination for a specific task can be identified.

Figure 5:
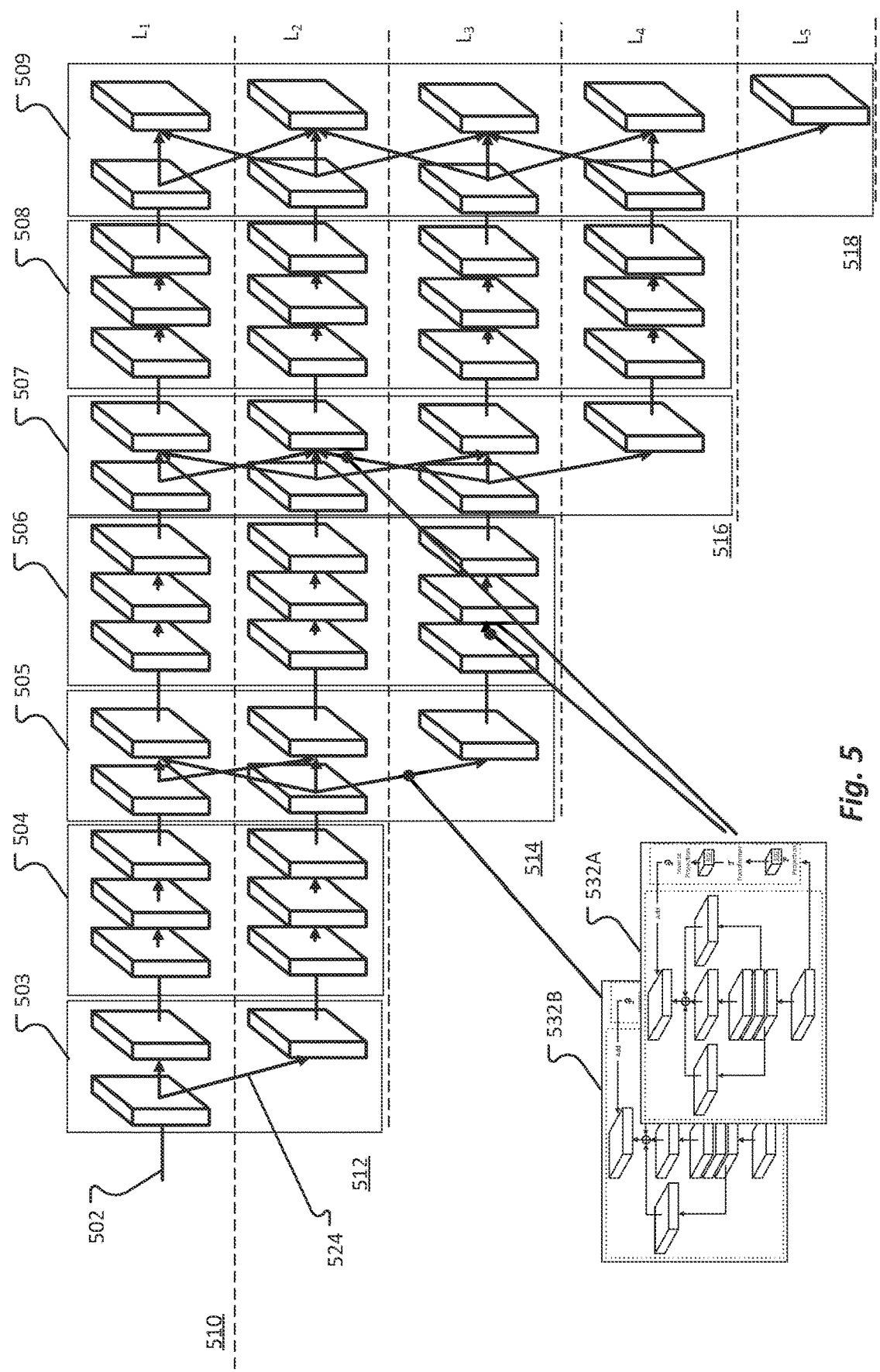
FIG. 5 depicts another example of the multi-branch search space for dense predictions in accordance with examples of the present disclosure.

FIG. 5 depicts additional details of the multi-branch search space for dense predictions in accordance with examples of the present disclosure. In examples, the multi-branch search space includes a high-resolution convolution stream that is received at a first stage, and gradually adds high-to-low resolution streams one by one, forming new stages, and connecting multiresolution streams in parallel. As a result, the resolutions for the parallel streams of a later stage includes the resolutions from the previous stage, and an additional lower resolution. In accordance with examples of the present disclosure, a first fusion module 503 may receive, as input, a high-resolution convolution stream 502, where the high-resolution convolution stream may be at a first resolution 510. The first fusion module 503 may be the same as or similar to the fusion module 306. The first fusion module 503 may add a high-to-low resolution stream corresponding to a second step or resolution 512. For example, a searching block 524, which is represented by an arrow and may be the same as or similar to a search block 406 (FIG. 4), may initiate the convolution stream of the second resolution 512.

A parallel module 504, which may be the same as or similar to the parallel module 308 and/or 320 of FIG. 3, may stack searching blocks, represented by arrows, in each branch, where a first branch may correspond to a first resolution 510 and the second branch may correspond to the second resolution 512. The searching blocks in the parallel module 504 may be the same as or similar to the search blocks 406 of FIG. 4. Another fusion module 505, which may be the same as or similar to the fusion module 336 of FIG. 3, may exchange information across multi-resolution representations (e.g., features at a first resolution 510 and features at a second resolution 512). Accordingly, the fusion module 505 may up-sample feature information from the second resolution 512 and fuse such information with the feature information from the first resolution 510. Similarly, the fusion module 505 may down-sample feature information from the first resolution 510 and fuse such information with feature information from the second resolution 512. Similar to the fusion module 503, the fusion module 505 may add a high-to-low resolution stream corresponding to a third step or resolution 514.

A parallel module 506 may be between the fusion module 505 and a fusion module 507. The fusion module 507 may up-sample feature information from the second resolution 512 and fuse such information with the feature information from the first resolution 510. Similarly, the fusion module 507 may down-sample feature information from the first resolution 510 and fuse such information with feature information from the second resolution 512 and feature information up-sampled from the third resolution 514. The fusion module 507 may down-sample feature information from the second resolution 512 and fuse such information with feature information from the third resolution 514. Similar to the fusion modules 503 and 505, the fusion module 507 may add a high-to-low resolution stream corresponding to a fourth step or resolution 516. In examples, the fusion module 507 is the same as or similar to the fusion module 314 of FIG. 3.

A parallel module 508 may reside between the fusion module 507 and a fusion module 509. The fusion module 509 may operate in a similar manner as the fusion module 507, fusing feature information from various resolutions and adding a high-to-low resolution stream corresponding to a fifth step or resolution 518. In examples, the number of parallel modules and fusion modules may be different than that which is depicted in FIG. 3, FIG. 4, and/or FIG. 5. In examples, there may be more or less fusion modules and feature modules than that which is depicted.

In examples, the searching blocks represented by arrows may be a searching block 532A and/or 532B, where the searching block 532A may be the same as or similar to the searching block 406 (FIG. 4), which may include convolution layers 412 and a transformer 430. The searching block 532A, in some examples, may perform a low-to-high resolution feature transformation; in some examples, the resolution of the feature transformation may remain the same. In some examples, the searching block implementing a high-to-low resolution feature transformation may implement a searching block 532B, where the searching block 532A may be the same as or similar to the searching block 406 (FIG. 4), which may include convolution layers 412 and a transformer 430. The searching block 532B may be referred to as a reduction searching block.

Figure 6:
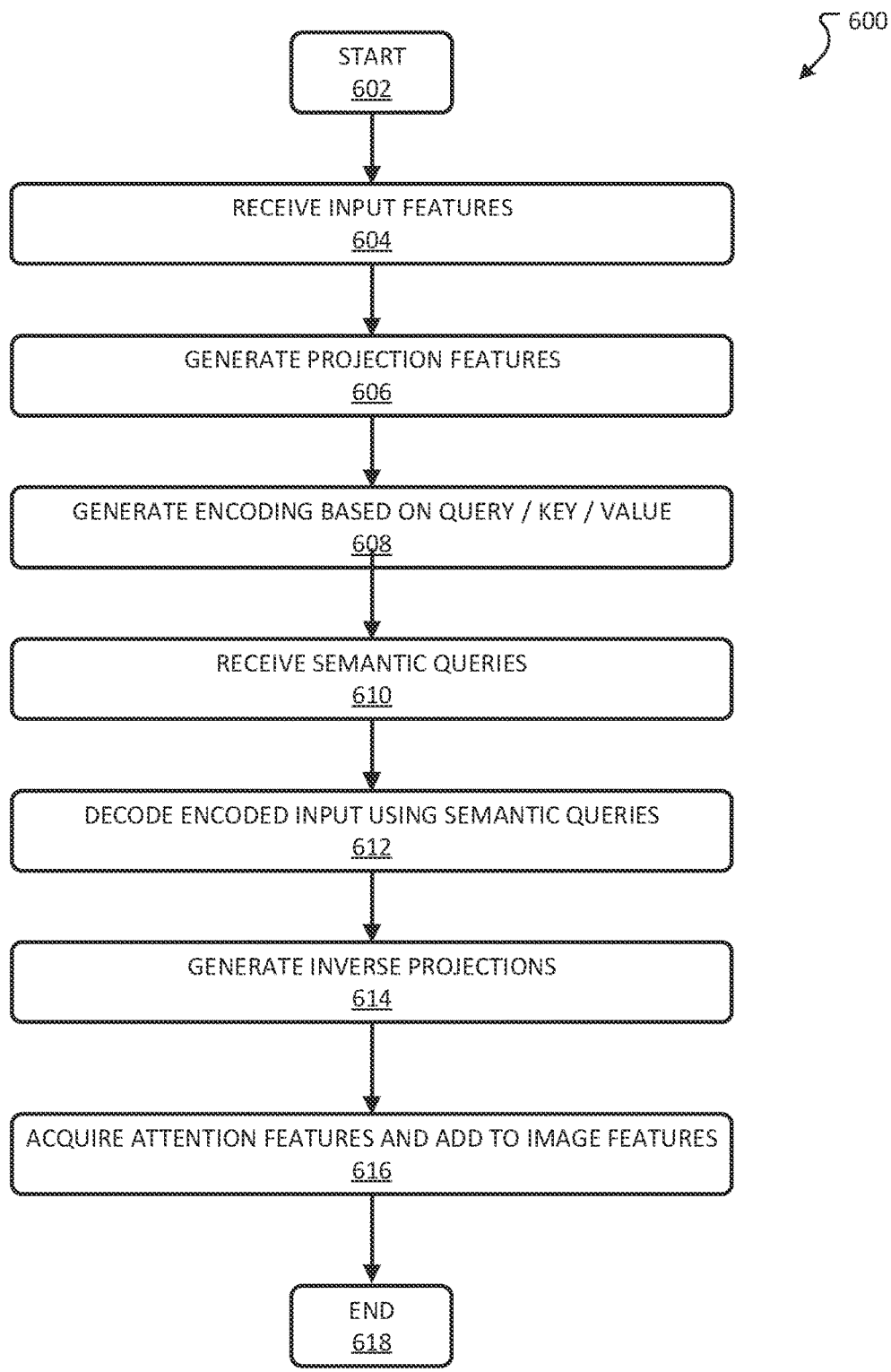
FIG. 6 depicts details of a method for generating attention maps using a transformer in accordance with examples of the present disclosure.

FIG. 6 depicts details of a method 600 for generating attention maps using a transformer in accordance with examples of the present disclosure. A general order for the steps of the method 600 is shown in FIG. 6. Generally, the method 600 starts at 602 and ends at 618. The method 600 may include more or fewer steps or may arrange the order of the steps differently than those shown in FIG. 6. The method 600 can be executed as a set of computer-executable instructions executed by a computer system and encoded or stored on a computer readable medium. In examples, aspects of the method 600 are performed by one or more processing devices, such as a computer or server. Further, the method 600 can be performed by gates or circuits associated with a processor, Application Specific Integrated Circuit (ASIC), a field programmable gate array (FPGA), a system on chip (SOC), a neural processing unit, or other hardware device. Hereinafter, the method 600 shall be explained with reference to the systems, components, modules, software, data structures, user interfaces, etc. described in conjunction with FIGS. 1-5.

The method starts at 602, where flow may proceed to 604. At 604, one or more input feature maps may be received. To reduce computational cost, the input feature X is projected into a reduced size by a projection function $\mathcal{P}(\bullet)$ at 606. Compared with sinusoidal positional encoding and learned embeddings, the two-dimensional positional map P, which contains two channels, is more efficient in terms of computational requirements for lightweight visual models.

The encoder of the transformer may include a Multi-Head Self-Attention $\mathcal{A}(\bullet)$ configuration, which allows the encoder to jointly attend to information at different positions. Further, using a residual connection layer, the output of the Multi-Head Self-Attention configuration is combined with the inputs to the Multi-Head Self-Attention $\mathcal{A}$ to generate an encoder self-attention residual output. The encoder self-attention residual output is provided to a feed-forward network. At 608, an output from the encoder is provided to a Multi-Head Self-Attention configuration $\mathcal{A}$ of a decoder, where the Multi-Head Self-Attention configuration $\mathcal{A}$ of the decoder also receives semantic queries at 610. That is, the keys K and values V, are provided to the Multi-Head Self-Attention configuration $\mathcal{A}$ of the decoder from the encoder portion of the transformer; the queries Q are learnable semantic embeddings $S \in \mathbb{R}^{n \times s^2}$ (e.g., a set of n learnable $s^2$-dimensional sematic embeddings). The decoder may then obtain an output based on Q, K, and V at 612. That is, a Multi-Head Self-Attention configuration $\mathcal{A}$ uses the output of the encoder F as keys and values and the learnable semantic embeddings as queries. Using a residual connection layer, the output of the Multi-Head Self-Attention $\mathcal{A}$ configuration of the decoder is combined with the inputs to the Multi-Head Self-Attention $\mathcal{A}$ to generate decoder self-attention residual output. The output is provided to a position-wise feed-forward network $\mathcal{F}(\bullet)$ configuration. A residual connection feeds the input of the position-wise feed-forward network around the feed-forward network to an addition and normalization operation. The output of the decoder is then projected back to the original feature size c×h×w by an inverse projection function $\hat{P}(\bullet)$ at 614 to acquire attention features. The features may then be added to the image features X. In examples, the output of the Transformer may be added to a convolutional layer within a searching block (e.g., 406) as previously described. The method 600 may end at 618.

Figure 7:
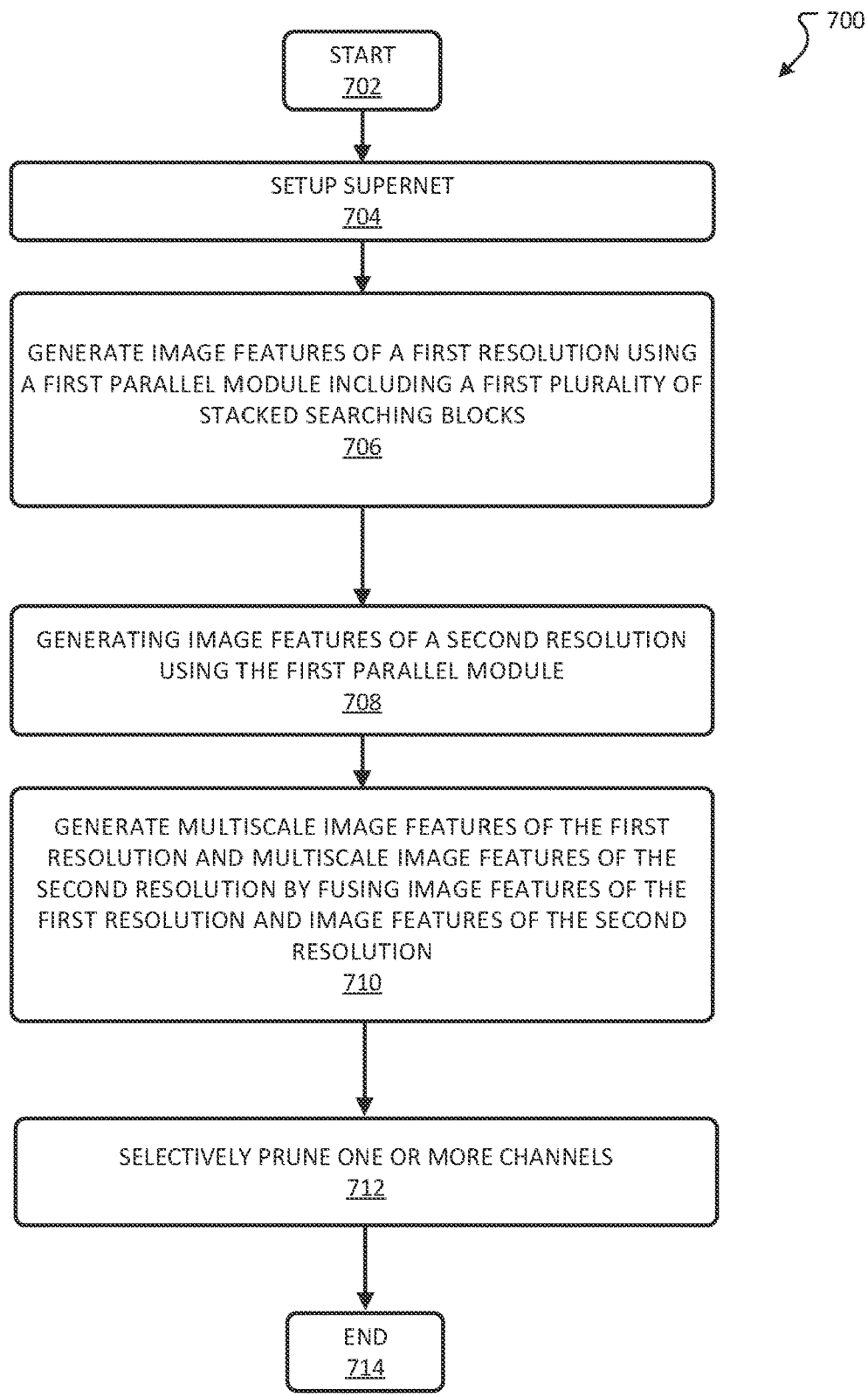
FIG. 7 depicts details of a method for performing a network architecture search in accordance with examples of the present disclosure.

FIG. 7 depicts details of a method 700 for performing a network architecture search in accordance with examples of the present disclosure. A general order for the steps of the method 700 is shown in FIG. 7. Generally, the method 700 starts at 702 and ends at 716. The method 600 may include more or fewer steps or may arrange the order of the steps differently than those shown in FIG. 7. The method 700 can be executed as a set of computer-executable instructions executed by a computer system and encoded or stored on a computer readable medium. In examples, aspects of the method 700 are performed by one or more processing devices, such as a computer or server. Further, the method 700 can be performed by gates or circuits associated with a processor, Application Specific Integrated Circuit (ASIC), a field programmable gate array (FPGA), a system on chip (SOC), a neural processing unit, or other hardware device. Hereinafter, the method 700 shall be explained with reference to the systems, components, modules, software, data structures, user interfaces, etc. described in conjunction with FIGS. 1-6.

The method starts at 702, where flow may proceed to 704. At 704, a SuperNet is setup or otherwise configured. The SuperNet may be the same as or similar to the SuperNet 302 (FIG. 3) and generally includes one or more parallel modules and one or more fusion modules, where each of the parallel modules and each of the fusion modules may include the searching block as previously described (e.g., 406 FIG. 4). Each searching block can include convolution layers and a transformer as previously described according to the examples of the present disclosure. In examples, convolutional layers of the SuperNet may reduce the spatial dimension of image features. For example, the spatial dimension of image features may be reduced by a factor of four. Starting at a high-resolution branch of the SuperNet, at 706, image features of a first resolution may be generated using a first plurality of stacked searching blocks in a first parallel module for example. At 708, image features of a second resolution may be generated by the first parallel module. For example, the first parallel module may include a plurality of stacked searching blocks at a first resolution level and a plurality of stacked searching blocks at a second resolution level. Thus, image features of the first resolution may be generated by the plurality of stacked searching blocks, and image features of the second resolution may be generated by the second plurality of stacked searching blocks. At 710, a fusion module may generate multiscale image features of the first resolution and multiscale image features of the second resolution by fusing image features of the first resolution and image features of the second resolution. In examples, a searching block in the fusion module may adjust a spatial dimension, or resolution, of the image features via up-sampling or down-sampling depending on which branch the fusion module resides. For example, a high-to-low resolution image feature transformation may be realized by a reduction searching block while the low-to-high resolution feature transformation may be realized with a different searching block. Accordingly, an output branch of the fusion module may include information from a plurality of branches of the SuperNet. In some examples, the SuperNet may be pruned at 712. That is, a portion of the convolutional channels and transformer queries of some searching blocks may be discarded as previously described. The method 700 may end at 714.

Figure 8:
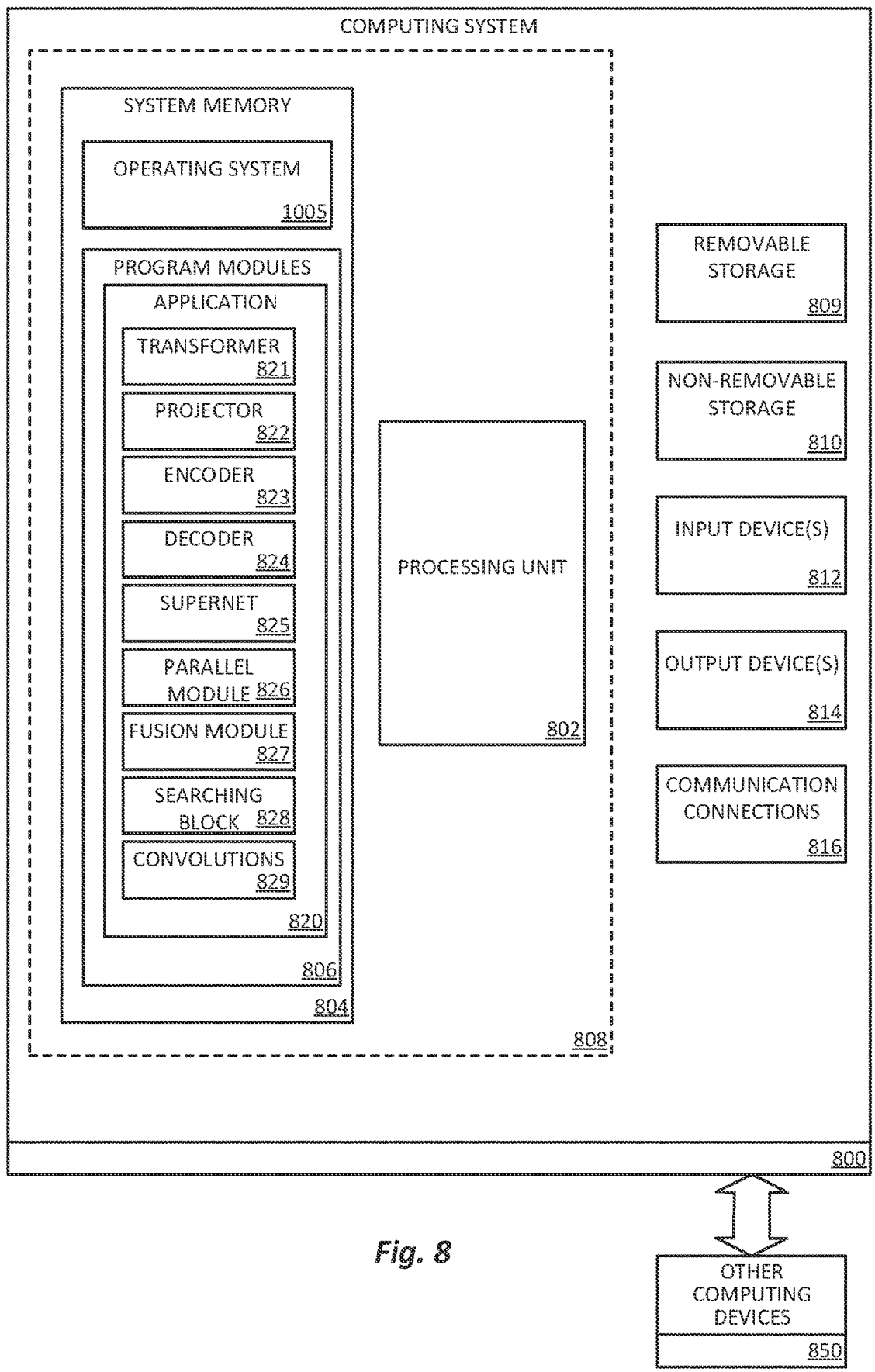
FIG. 8 is a block diagram illustrating physical components (e.g., hardware) of a computing system with which aspects of the disclosure may be practiced.

FIG. 8 is a block diagram illustrating physical components (e.g., hardware) of a computing system 800 with which aspects of the disclosure may be practiced. The computing system components described below may be suitable for the computing and/or processing devices described above. In a basic configuration, the computing system 800 may include at least one processing unit 802 and a system memory 804. Depending on the configuration and type of computing device, the system memory 804 may comprise, but is not limited to, volatile storage (e.g., random-access memory (RAM)), non-volatile storage (e.g., read-only memory (ROM)), flash memory, or any combination of such memories.

The system memory 804 may include an operating system 805 and one or more program modules 806 suitable for running software application 820, such as one or more components supported by the systems described herein. As examples, system memory 804 may include one or more of the following: transformer 821, projector 822, encoder 823, decoder 824, SuperNet 825, parallel module 826, fusion module 827, searching block 828, and/or convolution configuration 829. The transformer 821 may be the same as or similar to the transformer 102 previously described. The projector 822 may be the same as or similar to the projector 110 previously described. The encoder 823 may be the same as or similar to the transformer 102 previously described. The decoder 824 may be the same as or similar to the decoder 106 previously described. The SuperNet 825 may be the same as or similar to the SuperNet 302 previously described. The parallel module 826 may be the same as or similar to the parallel module 320 previously described. The fusion module 827 may be the same as or similar to the fusion module 336 previously described. The searching block 828 may be the same as or similar to the searching block 406 previously described. The convolution configuration 829 may be the same as or similar to the convolutional layers 412 as previously described. One or more of the components depicted in the system memory 804 may include one or more of the other components depicted in the system memory 804. For example, the transformer 821 may include an encoder 823 and a decoder 824. The operating system 805, for example, may be suitable for controlling the operation of the computing system 800.

Furthermore, examples of the disclosure may be practiced in conjunction with a graphics library, other operating systems, or any other application program and is not limited to any particular application or system. This basic configuration is illustrated in FIG. 8 by those components within a dashed line 808. The computing system 800 may have additional features or functionality. For example, the computing system 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., software applications 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit, discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing system 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing system 800 may also have one or more input device(s) 812 such as a keyboard, a mouse, a pen, a sound or voice input device, a touch or swipe input device, etc. The one or more input device 812 may include an image sensor. The output device(s) 814 such as a display, speakers, a printer, etc. may also be included. The aforementioned devices are examples and others may be used. The computing system 800 may include one or more communication connections 816 allowing communications with other computing devices/systems 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 800. Any such computer storage media may be part of the computing system 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
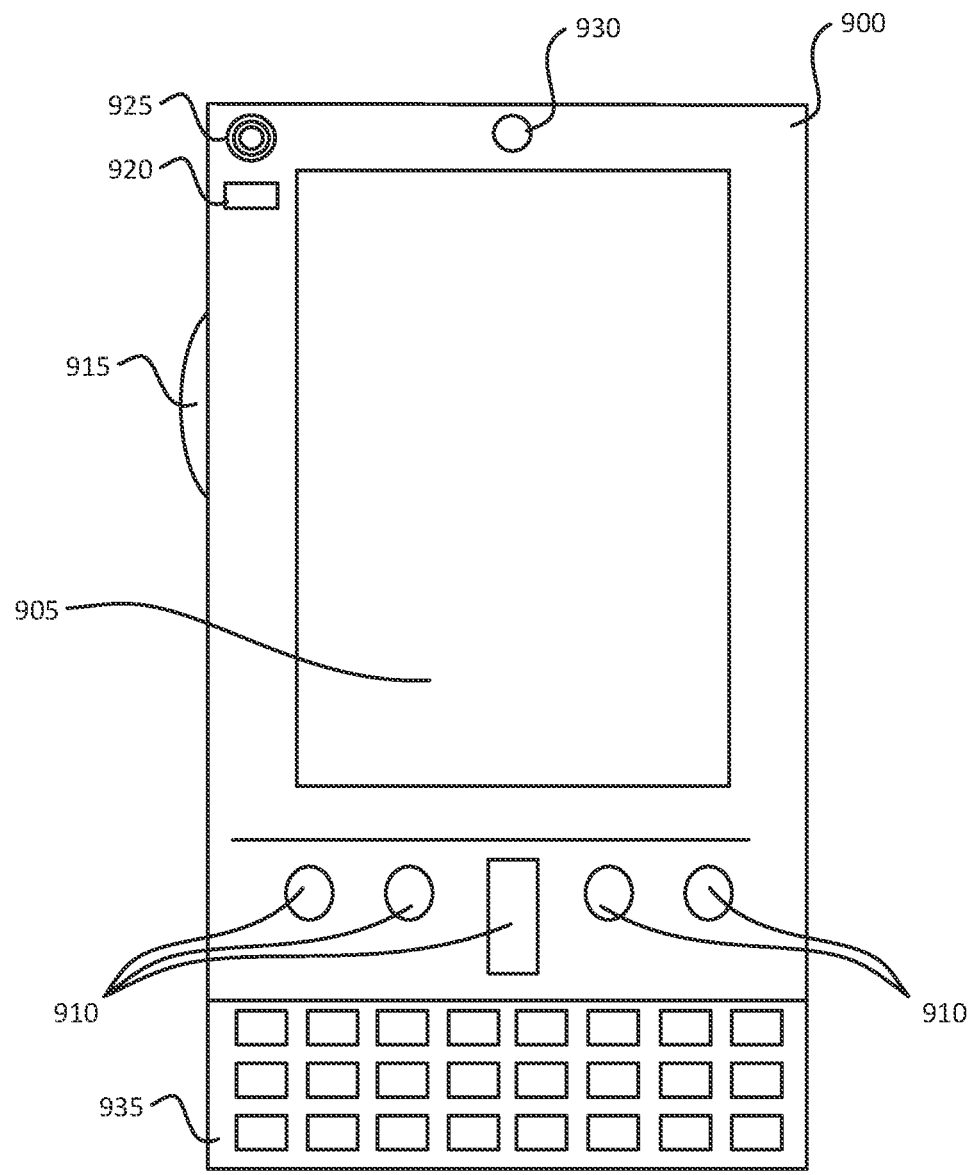
FIGS. 9A-9B illustrate a mobile computing device with which aspects of the disclosure may be practiced.
Figure 9B:
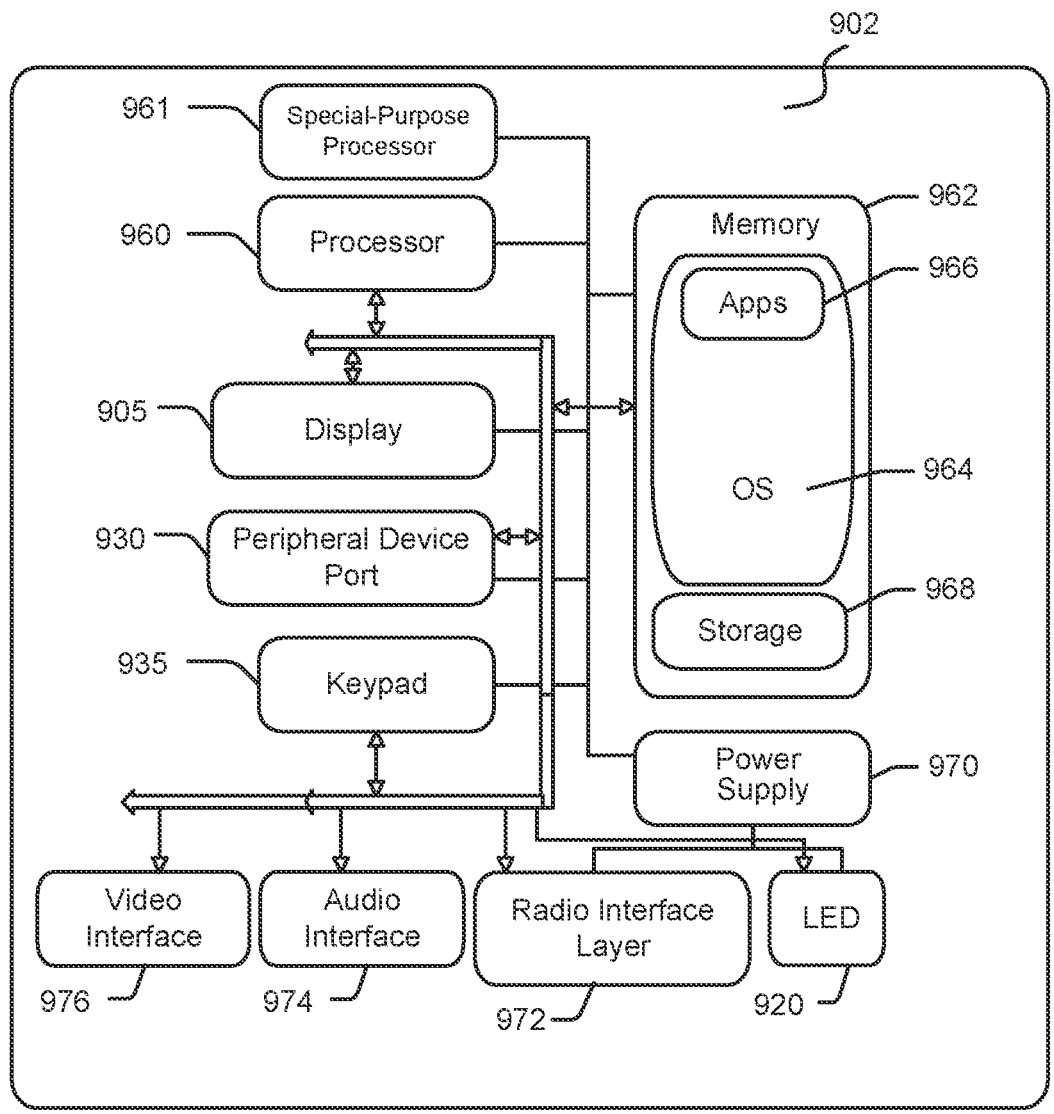

FIGS. 9A-9B illustrate a mobile computing device 900, for example, a mobile telephone, a smart phone, wearable computer (such as a smart watch), a tablet computer, a laptop computer, and the like, with which examples of the disclosure may be practiced. In some examples, the mobile computing device 900 may utilize a trained search space and/or trained model to perform one or more tasks, such as an image classification task. In other example, the mobile computing device 900 may provide information to system, such as the computing system 800, and receiving information from the computing system 800. In some examples, the mobile computing device 900 may be the same as or similar to the computing system 800. In some respects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display).

If included, an optional side input element 915 allows further user input. The side input element 915 may be a rotary switch, a button, or any other type of manual input element. In alternative aspects, mobile computing device 900 may incorporate greater or fewer input elements. For example, the display 905 may not be a touch screen in some embodiments.

In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display.

In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, media clients/players, and other apps). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, imaging programs, multimedia programs, video programs, word processing programs, spreadsheet programs, Internet browser programs, messaging programs, maps programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
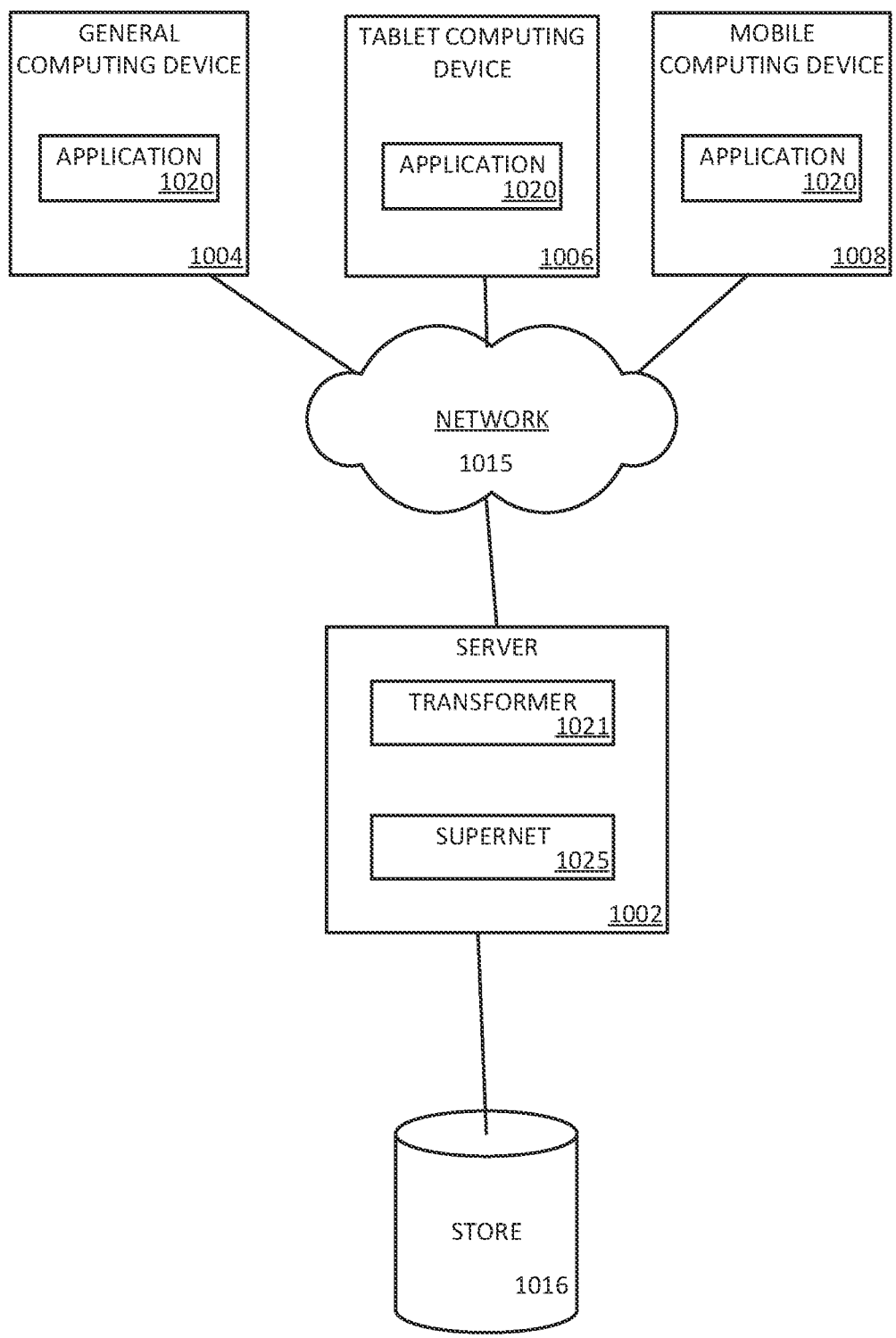
FIG. 10 illustrates an aspect of the architecture of a system for processing data in accordance with examples of the present disclosure.

FIG. 10 illustrates one aspect of the architecture of a system for processing data received at a computing system from a remote source, such as a personal computer 1004, tablet computing device 1006, or mobile computing device 1008, as described above. The personal computer 1004, tablet computing device 1006, or mobile computing device 1008 may include one or more applications. Content at a server device 1002 may be stored in different communication channels or other storage types.

One or more of the previously described program modules or software applications 804 (FIG. 8) may be employed by server device 1002 and/or the personal computer 1004, tablet computing device 1006, or mobile computing device 1008, as described above. For example, the server device 1002 may include a transformer 1021 and/or a SuperNet 1025; the SuperNet 1025 may be included in an untrained state and/or after training, as a network model trained for a specific task, such as image classification for example.

The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The present disclosure relates to systems and methods for obtaining attention features according to at least the examples provided in the sections below:

(A1) In one aspect, some examples include a method of obtaining attention features. The method may include receiving, at a projector of a transformer, a plurality of tokens associated with image features of a first dimensional space; generating, at the projector of the transformer, projected features by concatenating the plurality of tokens with a positional map, the projected features having a second dimensional space that is less than the first dimensional space; receiving, at an encoder of the transformer, the projected features and generating encoded representations of the projected features using self-attention; decoding, at a decoder of the transformer, the encoded representations and obtaining a decoded output; and projecting the decoded output to the first dimensional space and adding the image features of the first dimensional space to obtain attention features associated with the image features.

(A2) In some examples of A1, the method further includes applying, at the encoder of the transformer, self-attention to the projected features using a multi-head self-attention configuration, the multi-head self-attention configuration receiving the projected features as keys, values, and queries from the projector.

(A3) In some examples of A1-A2, the method further includes combining a result of applying the self-attention to the projected features with the keys, values, and queries from the projector to generate encoder self-attention residential output; and processing the encoder self-attention residual output to generate the encoded representations.

(A4) In some examples of A1-A3, the method further includes applying, at the decoder of the transformer, self-attention to the encoded representations using a multi-head self-attention configuration, the multi-head self-attention configuration receiving as input, keys and values from the encoder and one or more semantic embeddings as queries.

(A5) In some examples of A1-A4, the method further includes combining a result of applying the self-attention to the encoded representations with the keys and values from the encoder and one or more semantic embeddings to generate decoder self-attention residual output; and processing the decoder self-attention residual output to generate the decoded output, wherein the decoded output is at the second dimensional space.

(A6) In some examples of A1-A5, the projected features are obtained using a bilinear interpolation.

(A7) In some examples of A1-A6, the positional map includes a two-dimensional positional map.

In yet another aspect, some examples, include a computing system including one or more processors and memory coupled to the one or more processors, the memory storing one or more programs configured to be executed by the one or more processors, the one or more programs including instructions for performing any of the methods described herein (e.g., A1-A7 described above).

In yet another aspect, some examples include a non-transitory computer-readable storage medium storing one or more programs for execution by one or more processors of a storage device, the one or more programs including instructions for performing any of the methods described herein (e.g., A1-A7 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of obtaining attention features, the method comprising:
   receiving, at a projector of a transformer, a plurality of tokens associated with image features of a first dimensional space;
   generating, at the projector of the transformer, projected features by concatenating the plurality of tokens with a positional map, the projected features having a second dimensional space that is less than the first dimensional space;
   receiving, at an encoder of the transformer, the projected features and generating encoded representations of the projected features using self-attention;
   decoding, at a decoder of the transformer, the encoded representations of the projected features and obtaining a decoded output; and
   projecting the decoded output to the first dimensional space and adding the image features of the first dimensional space to obtain attention features associated with the image features.

2. The method of claim 1, further comprising:
   applying, at the encoder of the transformer, self-attention to the projected features using a multi-head self-attention configuration, the multi-head self-attention configuration receiving the projected features as keys, values, and queries from the projector.

3. The method of claim 2, further comprising:
   combining a result of applying the self-attention to the projected features with the keys, values, and queries from the projector to generate encoder self-attention residential output; and
   processing the encoder self-attention residual output to generate the encoded representations of the projected features.

4. The method of claim 2, further comprising:
   applying, at the decoder of the transformer, self-attention to the encoded representations of the projected features using a multi-head self-attention configuration, the multi-head self-attention configuration receiving as input, keys and values from the encoder and one or more semantic embeddings as queries.

5. The method of claim 4, further comprising:
   combining a result of applying the self-attention to the encoded representations of the projected features with the keys and values from the encoder and one or more semantic embeddings to generate decoder self-attention residual output; and
   processing the decoder self-attention residual output to generate the decoded output,
   wherein the decoded output is at the second dimensional space.

6. The method of claim 1, wherein the projected features are obtained using a bilinear interpolation.

7. The method of claim 1, wherein the positional map includes a two-dimensional positional map.

8. A system, comprising:
   one or more storage devices storing instructions that when executed by one or more hardware processors, cause the one or more hardware processors to implement a neural network for generating image attention features by processing image features combined with a two-dimensional position map, the neural network comprising:
   a projector of a transformer configured to receive a plurality of tokens associated with image features of a first dimensional space and generate projected features by concatenating the plurality of tokens with the two-dimensional positional map, the projected features having a second dimensional space that is less than the first dimensional space;
   an encoder of the transformer configured to receive projected features and generate encoded representations of the projected features using self-attention; and
   a decoder configured to decode the encoded representations of the projected features and obtain a decoded output,
   wherein the decoded output is projected to the first dimensional space and combined with the image features of the first dimensional space to obtain the attention features.

9. The system of claim 8, wherein the encoder is configured to apply, at the encoder of the transformer, self-attention to the projected features using a multi-head self-attention configuration, the multi-head self-attention configuration receiving the projected features as keys, values, and queries from the projector.

10. The system of claim 9, wherein the encoder is configured to:

combine a result of applying the self-attention to the projected features with the keys, values, and queries from the projector to generate encoder self-attention residential output; and process the encoder self-attention residual output to generate the encoded representations of the projected features.

11. The system of claim 9, wherein the decoder of the transformer is configured to apply self-attention to the encoded representations of the projected features using a multi-head self-attention configuration, the multi-head self-attention configuration receiving as input, keys and values from the encoder and one or more semantic embeddings as queries.

12. The system of claim 11, wherein the decoder is configured to:

combine a result of applying the self-attention to the encoded representations of the projected features with the keys and values from the encoder and one or more semantic embeddings to generate decoder self-attention residential output; and process the decoder self-attention residual output to generate the decoded output, wherein the decoded output is at the second dimensional space.

13. The system of claim 8, wherein the projected features are obtained using a bilinear interpolation.

14. A non-transitory computer-readable storage medium comprising instructions being executable by one or more processors to perform a method, the method comprising:

receiving, at a projector of a transformer, a plurality of tokens associated with image features of a first dimensional space;

generating, at the projector of the transformer, projected features by concatenating the plurality of tokens with a positional map, the projected features having a second dimensional space that is less than the first dimensional space;

receiving, at an encoder of the transformer, the projected features and generating encoded representations of the projected features using self-attention;

decoding, at a decoder of the transformer, the encoded representations of the projected features and obtaining a decoded output; and projecting the decoded output to the first dimensional space and adding the image features of the first dimensional space to obtain attention features associated with the image features.

15. The computer-readable storage medium of claim 14, wherein the method further includes applying, at the encoder of the transformer, self-attention to the projected features using a multi-head self-attention configuration, the multi-head self-attention configuration receiving the projected features as keys, values, and queries from the projector.

16. The computer-readable storage medium of claim 15, wherein the method further includes:

combining a result of applying the self-attention to the projected features with the keys, values, and queries from the projector to generate encoder self-attention residential output; and processing the encoder self-attention residual output to generate the encoded representations of the projected features.

17. The computer-readable storage medium of claim 15, wherein the method further includes applying, at the decoder of the transformer, self-attention to the encoded representations of the projected features using a multi-head self-attention configuration, the multi-head self-attention configuration receiving as input, keys and values from the encoder and one or more semantic embeddings as queries.

18. The computer-readable storage medium of claim 17, wherein the method further includes:

combining a result of applying the self-attention to the encoded representations of the projected features with the keys and values from the encoder and one or more semantic embeddings to generate decoder self-attention residential output; and processing the decoder self-attention residual output to generate the decoded output, wherein the decoded output is at the second dimensional space.

19. The computer-readable storage medium of claim 14, wherein the projected features are obtained using a bilinear interpolation.

20. The computer-readable storage medium of claim 14, wherein the positional map includes a two-dimensional positional map.

* * * * *